Figure 5:
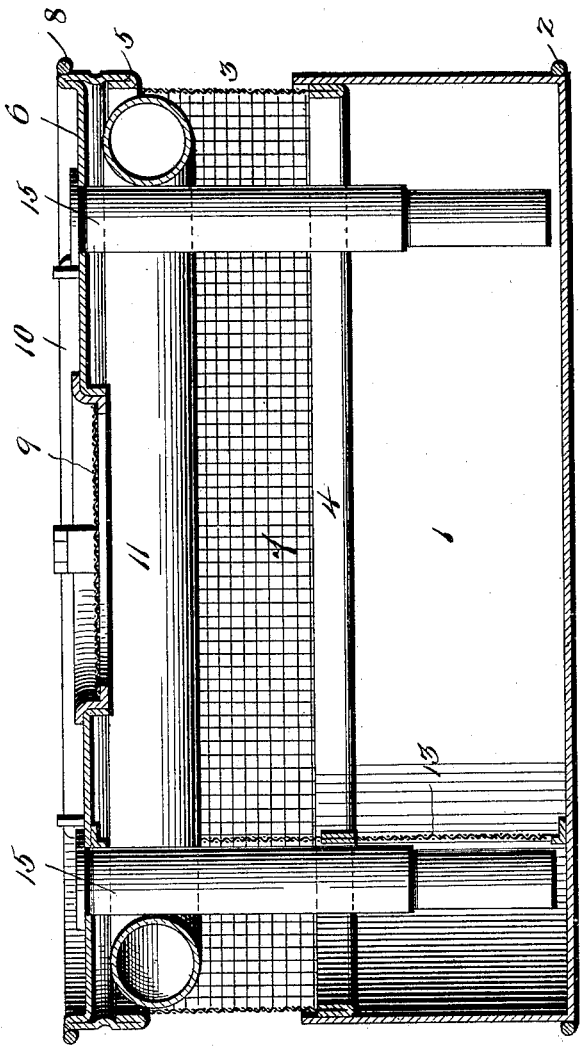

No. 706,407.  
J. B. HALL.  
BAIT BUCKET.  
(Application filed Oct. 2, 1901.)  
(No Model.)  
Patented Aug. 5, 1902.  
3 Sheets—Sheet 1.
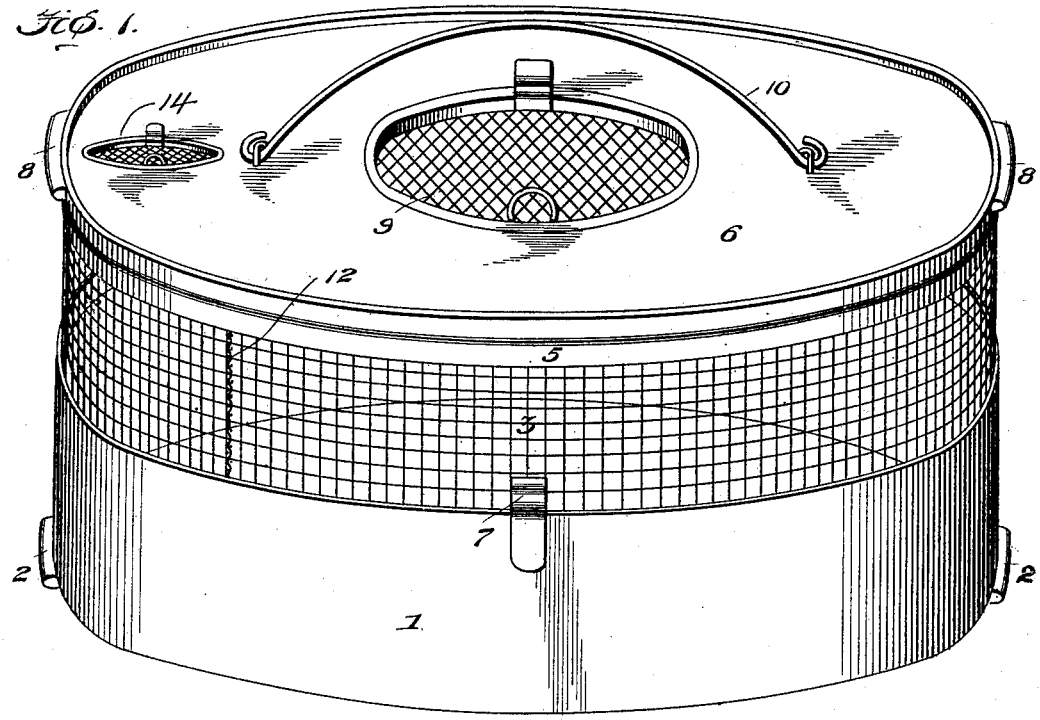
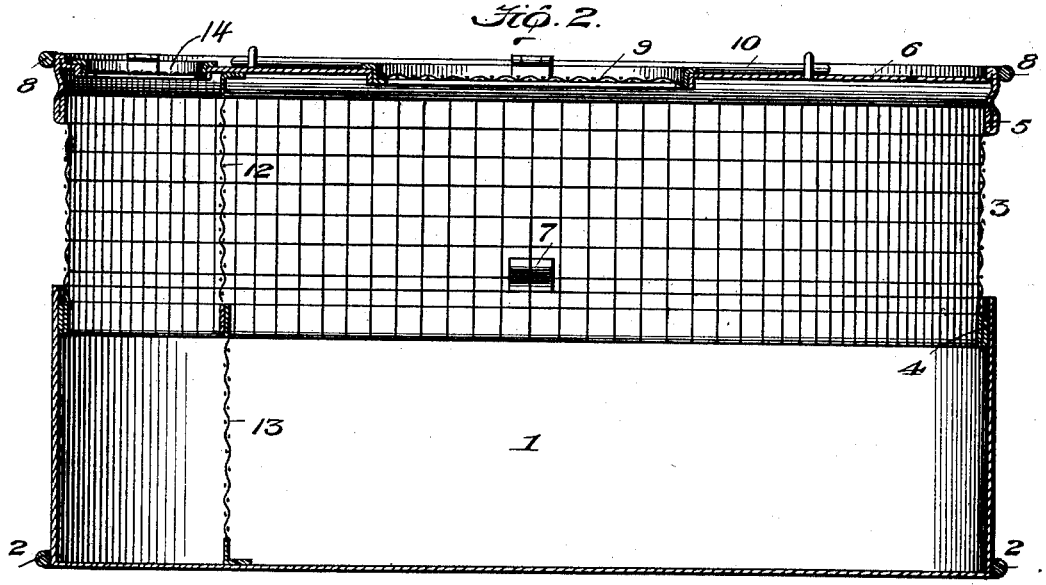
WITNESSES:
INVENTOR  
J. B. Hall  
BY E. S. Bond  
ATTORNEY
THE NORRIS PETERS CO., PHOTO-LITHO., WASHINGTON, D. C.

No. 706,407. Patented Aug. 5, 1902.
J. B. HALL.
BAIT BUCKET.
(Application filed Oct. 2, 1901.)
(No Model.) 3 Sheets—Sheet 2.
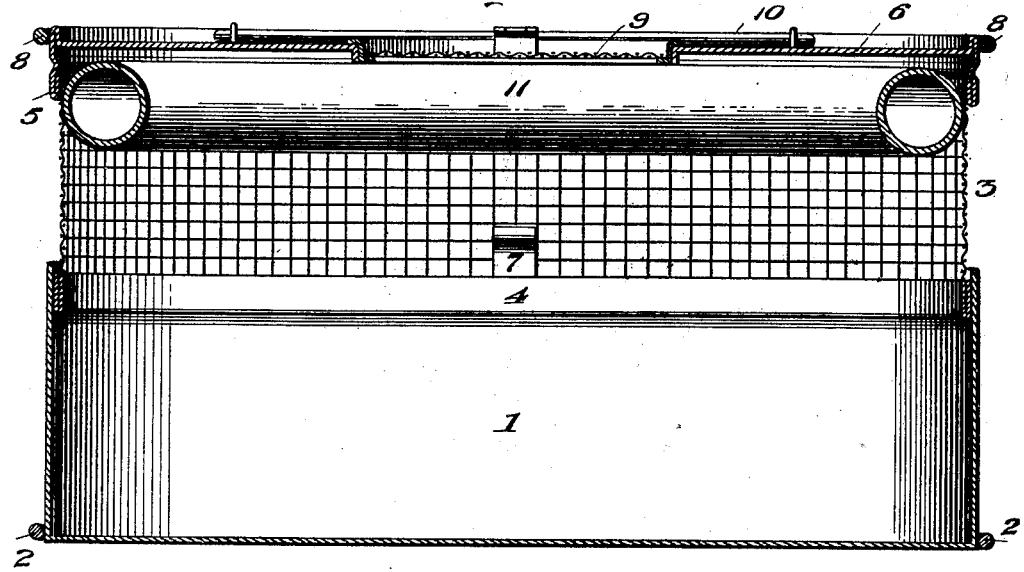
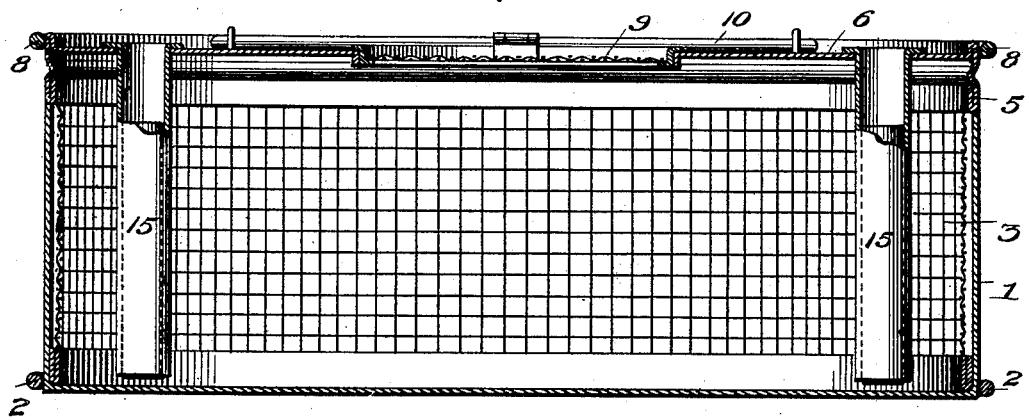
WITNESSES: INVENTOR
J. B. Hall
BY
E. K. Bond
ATTORNEY No. 706,407. Patented Aug. 5, 1902.
J. B. HALL.
BAIT BUCKET.
(Application filed Oct. 2, 1901.)
(No Model.) 3 Sheets—Sheet 3.

Witnesses
Inventor
James B. Hall.
by E. H. Bond Attorney

UNITED STATES PATENT OFFICE.

JAMES B. HALL, OF CLEVELAND, OHIO.

BAIT-BUCKET.

SPECIFICATION forming part of Letters Patent No. 706,407, dated August 5, 1902.

Application filed October 2, 1901. Serial No. 77,286. (No model.)

*To all whom it may concern:*

Be it known that I, JAMES B. HALL, a citizen of the United States, residing at Cleveland, in the county of Cuyahoga and State of Ohio, have invented certain new and useful Improvements in Bait-Buckets; and I do hereby declare the following to be a full, clear, and exact description of the invention, such as will enable others skilled in the art to which it appertains to make and use the same.

This invention relates to certain new and useful improvements in bait-buckets of that class designed for holding and carrying live bait and having provision for the admission of air, which next to water is most essential to the life of the minnow.

The present invention has for its objects, among others, to provide an improved bucket in which provision is made for the prolonging of the life of the minnow double the time of the life of the bait carried in the prior forms of bucket. I make the bucket or box in telescopic sections, two or more, as may be found most expedient, which will take up at most but one-half the space of the ordinary minnow-bucket when closed, yet when opened for use will be as large as the old forms. I make the sections, one or more, of woven wire, or some suitable reticulated material, or metal provided with suitable holes, so as to admit air all around the sides in addition to the openings in the lid. Still, when filled to the top of the bottom section will hold as much water as can be put in the old style of bucket of the same capacity without expelling the air from the bucket and prohibiting the air from circulating, and the water from agitating, both of which are essential to the life of the minnow. The almost unrestricted admission of air and the open agitation naturally received from handling will serve to prolong the life of the minnow, and by my construction not only the few minnows on the top get the air and live while those at the bottom not having air die off rapidly, as in the old forms, but the entire water-surface being exposed and air being freely admitted to all parts all of the minnows will be kept alive. Besides, my bucket can easily be kept sanitary, which is essential to the life of the minnor. Besides a saving in space when closed I provide a space that can be occupied for storage, &c., and a full-sized minnow-bucket when open or distended for use.

The bucket may be made of any suitable material and of any preferred shape or dimensions and of any required number of sections made of all woven wire or of metal punctured or otherwise to provide the requisite air-openings. The sections are made to fit snugly one within the other, so as to be held frictionally in their adjusted positions, and in some instances I may provide spring-stays or other means for engaging the sections to give additional support to hold the bucket open and make it more substantial and rigid for use. Said stays may also serve to hold the sections closed.

The bucket may be made with or without the ability to float in water. When made to float, I prefer that this property be given the bucket by placing on the inside of the top a rubber or other waterproof air-chamber of any desirable shape and size to float the bucket and to fit the same, so that the air-chamber or float may be made entirely separate from the bucket and attached and held in position by its own pressure or by any other suitable means.

In some instances it is desirable to have the bucket so constructed that besides the minnows other bait—such as frogs, crawfish, and the like—may be carried, and for this purpose I provide a separate compartment readily accessible without opening the door to the main compartment or disturbing the other parts of the bucket.

Other objects and advantages of the invention will hereinafter appear, and the novel features thereof will be specifically defined by the appended claims.

The invention in its preferable form is clearly illustrated in the accompanying drawings, which, with the numerals of reference marked thereon, form a part of this specification, and in which—

Figure 1 is a perspective view of my improved bucket with the parts distended ready for use. Fig. 2 is a substantially central longitudinal vertical section through the same with a separate compartment for different varieties of bait. Fig. 3 is a similar view to Fig. 2 with the separate compartment omitted and showing the air-chamber adapting the bucket to float. Fig. 4 is a substantially central vertical longitudinal section with the bucket closed and showing tubes for admitting water when desired, the said tubes being shown in elevation with parts broken away and portions in section. Fig. 5 is a substantially central vertical section through a bait-bucket provided with a float, telescopic tubes, and separate bait-receptacle.

Like numerals of reference indicate like parts throughout the several views.

Referring now to the details of the drawings, 1 designates the body or main or bottom section of the bucket, which may be of any suitable material and size and shape, preferably of the oval form shown. It is open at the top and at opposite ends is provided exteriorly with the lugs or extensions 2, which serve to receive the feet or other means to hold the same while the sections are being extended, as will be readily understood.

In the present instance I have chosen to show the bucket as composed of but two parts—the bottom section just described and a single movable section 3, which in this instance is shown as formed of a woven-wire netting or the like, with its lower edge secured in a metal strip 4 and its upper edge held in a like metal strip 5, which is extended to form the lid or cover 6, as clearly seen in Fig. 2, but as the details of this mode of connection are not essential and as any other means may be substituted a further description thereof is not deemed necessary. The strip 4 is made to fit snugly within the body or main section 1, so as to be held frictionally in any position to which it may be adjusted.

Any suitable means may be provided for preventing the inner section from being entirely withdrawn from the bottom section. This may be accomplished by reason of the tight fit of the inner section within the other, the walls of the bottom vessel yielding sufficiently to allow of the inner section being pulled out till its lower portion reaches the upper end of the bottom vessel, when by reason of the greater rigidity and unyielding nature of the upper end of the bottom section and of the lower end of the inner section the entire withdrawal of the inner section is prevented. The top of the bottom section might be made slightly smaller than the bottom or tapered.

It may sometimes be advisable to provide other means for firmly holding the sections 3 distended, such as the spring-stays 7, secured at their lower ends to the main section 1 and their upper ends bent inward to engage the wires of the section 3, as seen in Figs. 1 and 2. These stays are omitted from Fig. 4.

The lid or cover 6 is provided with lugs or extensions 8 in vertical alinement with the lugs or extensions 2 of the main section, as shown, and these are designed to be grasped by the hands while the feet are on the said lugs 2 and pressure then applied, and the sections are distended and the bucket placed in condition for use. The lid or cover 6 is provided with an opening covered by a wire-netting or similar guard or shield 9, this guard being movable to permit of the admission and removal of the minnows. This may be hinged or bodily removable and held by a spring-catch or other means.

10 is a handle by which the bucket may be carried.

11 (seen in Fig. 3) is an air-chamber or float of rubber or any other suitable material adapted to give buoyancy to the bucket. It is shown as fitted with the section 3 adjacent the top and is held in such position by the pressure of its walls when distended by the air therein, but it is evident that it may be secured by other or additional means, if desired, the manner of connection being not essential. It may be inflated in any suitable manner. (Not shown.)

In Figs. 1 and 2 I have shown the bucket as provided with a separate compartment for the holding of frogs, crawfish, or other kinds of bait. It is constructed in this instance in this manner, although other means may be provided for thus forming a separate compartment.

12 is a partition, preferably of wire-netting, secured within the main section 1 at one end, while secured to the movable section 3 is another partition 13, adapted to move within the compartment formed by the partition 12 and the end wall of the main section 1, as seen in Fig. 2, and in the top 6 is an opening closed by a suitable closure 14, preferably reticulated for the admission of air, as seen best in Fig. 1. It will be seen that by this means the compartment thus formed is separated from the main portion of the bucket, and the minnows cannot get into the said compartment whether the bucket be opened or closed.

It it often desirable to admit fresh water and drive out that which has been contained in the bucket for some time and to do this without handling the minnows or disturbing them or leaving them for any length of time without water. For this purpose I provide the tubes 15, as shown in Fig. 4, carried by the section 3 and depending within the main section 1, as shown, their upper ends being open or adapted to be closed, if desired, in any suitable manner. These tubes are herein shown as telescopic, so that the water when introduced will be forced to the bottom of the bucket, the water therein being forced out and fresh water and air being admitted, thus freshening the water and adding to the life of the minnows. These tubes may, if desired, be otherwise disposed; but in all instances they are constructed to serve the same function of agitating the water and freshening the same.

In Fig. 5 I have shown a bucket provided with the float, telescopic tubes, and separate bait-receptacle, but it is evident that a bucket may be made with one or more of these omitted, as illustrated in the other views.

From the above it will be readily seen that I have devised a novel and cheap construction of bait-bucket which can not only be made to occupy minimum space and easily extended ready for use, but which will preserve the life of the minnows a maximum length of time, can be easily cleansed, carry different kinds of bait, and which will float if dropped into the water, and while the structural embodiment of the invention as herein disclosed is what I at the present time consider preferable it is evident that variations, changes, and modifications may be resorted to without departing from the spirit of the invention or sacrificing any of its advantages, and I therefore do not wish to restrict myself to the details of construction herein explained, but reserve the right to make such changes, variations, and modifications as come properly within the scope of the protection prayed.

When the bucket is not in use, it may be used to receive a box carrying the fishing-tackle, &c. The receptacle for frogs, &c., may sometimes be made separate, so as to be bodily removable from the bucket.

What is claimed as new is—

1. A bait-bucket made in telescopic sections, frictionally held in position, one of said sections being reticulated, as set forth.

2. A bait-bucket made in telescopic sections frictionally held in position, one of said sections being reticulated, and stays secured to one section and engaging the other section for giving additional support to the movable section, as set forth.

3. A bait-bucket comprising a main section, and a movable section of reticulated material having a bottom-holding ring snugly fitting within the main section, as and for the purpose specified.

4. A bait-bucket formed in telescopic sections with the one section fitting tightly within the other to be held frictionally in its adjusted positions, the upper edge of the movable section and the lower edge of the outer section being provided with outwardly-extending lugs as and for the purpose specified.

5. A bait-bucket formed of telescopic sections one of which is reticulated, the inner and movable section being provided with an independent, elastic, inflatable air-chamber serving as a float and held in position by the distention of the walls thereof, as set forth.

6. A bait-bucket in telescopic sections provided with a telescopic separate bait-compartment, as set forth.

7. A bait-bucket in telescopic sections, and provided with tubes for the admission of water to the bottom section, as and for the purpose specified.

8. In a bait-bucket the combination with a main section, of a section movable therein, and telescopic tubes carried by the movable section, as set forth.

9. A bait-bucket composed of a main non-reticulated section, a reticulated section movable therein and frictionally held in position, a partition within the main section at one end, and a partition depending from the movable section and movable within the compartment formed by the partition of the main section, and a removable closure to an opening in the top of the movable section to permit access to said compartment, as set forth.

In testimony whereof I affix my signature in presence of two witnesses.

JAMES B. HALL.

Witnesses:
D. I. BOYD,
B. VAN M. LA RUE.